US008580016B2

(12) United States Patent
Martinchek et al.

(10) Patent No.: US 8,580,016 B2
(45) Date of Patent: Nov. 12, 2013

(54) ADJUSTABLE AIR FLOW BYPASS IN A WATER VAPOR TRANSFER ASSEMBLY TO REDUCE BEGINNING OF LIFE WATER TRANSFER VARIATION

(75) Inventors: David A. Martinchek, Spencerport, NY (US); Thomas D. Bronchetti, Webster, NY (US); Ian R. Jermy, Leroy, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 182 days.

(21) Appl. No.: 13/223,588

(22) Filed: Sep. 1, 2011

(65) Prior Publication Data

US 2013/0056080 A1 Mar. 7, 2013

(51) Int. Cl.
*B01D 53/22* (2006.01)

(52) U.S. Cl.
USPC ............... 96/7; 95/43; 95/45; 95/11; 251/51

(58) Field of Classification Search
USPC .............. 95/43, 45, 52; 96/7, 11; 251/51
See application file for complete search history.

(56) References Cited

U.S. PATENT DOCUMENTS

| | | | | |
|---|---|---|---|---|
| 2,557,378 A | * | 6/1951 | Granberg | 137/630.14 |
| 3,274,751 A | * | 9/1966 | Skarstrom | 95/122 |
| 4,223,535 A | * | 9/1980 | Kumm | 62/235.1 |
| 6,289,919 B1 | * | 9/2001 | Sledd et al. | 137/115.03 |
| 6,464,854 B2 | * | 10/2002 | Andrews et al. | 205/628 |
| 7,819,958 B2 | * | 10/2010 | Hoffman et al. | 96/143 |
| 8,029,939 B2 | * | 10/2011 | Andreas-Schott et al. | 429/454 |
| 8,236,456 B2 | * | 8/2012 | Koenekamp et al. | 429/413 |
| 2009/0092863 A1 | | 4/2009 | Skala | |
| 2010/0255399 A1 | * | 10/2010 | Andreas-Schott et al. | 429/454 |
| 2011/0297261 A1 | * | 12/2011 | Martinchek et al. | 137/594 |
| 2013/0022897 A1 | * | 1/2013 | Martinchek et al. | 429/516 |

* cited by examiner

*Primary Examiner* — Jason M Greene
*Assistant Examiner* — Anthony Shumate
(74) *Attorney, Agent, or Firm* — Fraser Clemens Martin & Miller LLC; J. Douglas Miller

(57) ABSTRACT

A bypass unit for a water vapor transfer assembly includes a main body, a check valve, and an adjustable flow regulator. The main body has a conduit formed therethrough. The check valve is in communication with the conduit. The check valve normally militates against a flow of a bypass stream through the conduit and permits the flow of the bypass stream through the conduit above a threshold flow rate. The flow regulator is in communication with the conduit. The flow regulator permits an adjustment of the flow of the bypass stream to modify the water transfer rate of the water transfer assembly.

17 Claims, 3 Drawing Sheets

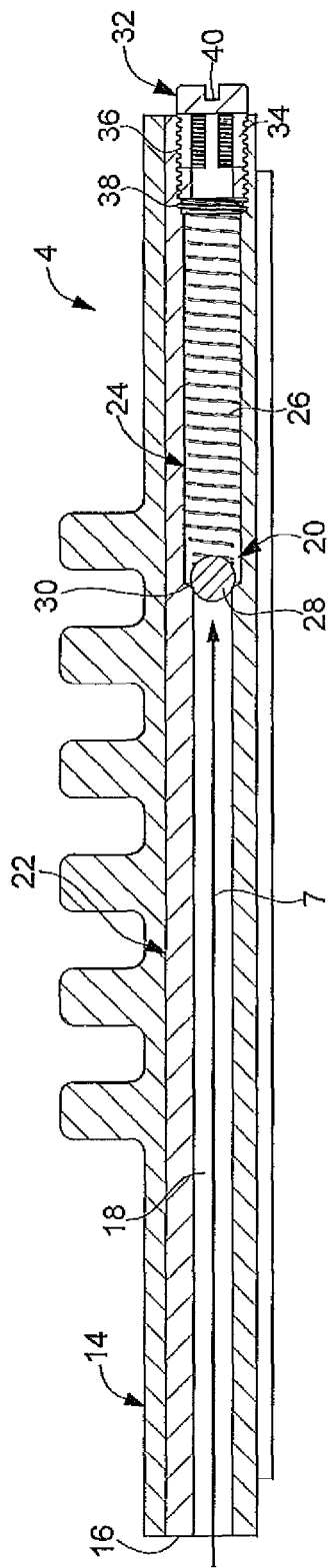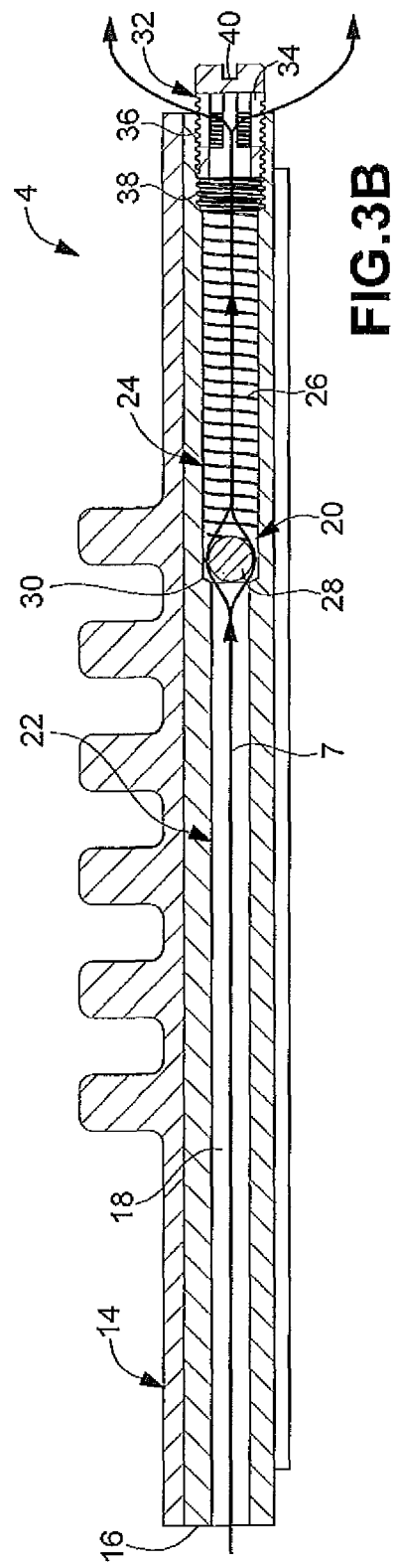

ADJUSTABLE AIR FLOW BYPASS IN A WATER VAPOR TRANSFER ASSEMBLY TO REDUCE BEGINNING OF LIFE WATER TRANSFER VARIATION

FIELD OF THE INVENTION

The present disclosure relates to a water vapor transfer assembly and, more particularly, to a water vapor transfer assembly for a fuel cell system.

BACKGROUND OF THE INVENTION

A fuel cell system is increasingly being used as a power source in a wide variety of applications. The fuel cell system has been proposed for use in vehicles as a replacement for internal combustion engines, for example. The fuel cell system may also be used as a stationary electric power plant in buildings and residences, portable power in video cameras, computers, and the like. Typically, the fuel cell system includes a plurality of fuel cells arranged in a fuel cell stack to generate electricity, which is used to charge batteries or provide power to an electric motor.

A typical fuel cell is known as a polymer electrolyte membrane (PEM) fuel cell, which combines a fuel such as hydrogen and an oxidant such as oxygen to produce electricity and water. The oxygen is generally supplied by an air stream. In order to perform within a desired efficiency range, a sufficient humidification of the polymer electrolyte membranes of the fuel cell should be maintained. The sufficient humidification desirably extends the useful life of the electrolyte membranes in the fuel cell, as well as maintains the desired efficiency of operation.

As part of the fuel cell system, a water vapor transfer (WVT) assembly may be employed to humidify the air stream entering the fuel cell stack. The WVT assembly transfers water vapor from an exhaust stream from the fuel cell stack to a feed stream entering the fuel cell stack. This is generally accomplished by using a water vapor transfer membrane which allows only water vapor to pass therethrough. This membrane is typically permanently attached to a diffusion media layer. The diffusion media layer is part of a separator that controls gas flow. For example, the separator may be comprised of two of the diffusion media layers separated by strings that define flow channels for gas flow in the separator.

An exemplary WVT assembly is described in Assignee's copending U.S. patent application Ser. No. 12/796,320 to Martinchek et al., the entire disclosure of which is hereby incorporated herein by reference. The WVT assembly includes a plurality of wet plates configured to receive a wet stream and a plurality of dry plates configured to receive a dry stream. The wet plates and the dry plates alternate in a stack and are separated from one another by water transfer membranes. The water vapor transfer assembly permits a transfer of water from the wet stream to the dry stream. The water vapor transfer assembly is disposed between a pair of end plates. The end plates each have a plurality of outwardly extending ribs.

As part of a fuel cell system, the WVT assembly can be used to humidify an air stream entering the fuel cell stack. It is known to assemble the WVT assembly within a housing having a pair of wet stream apertures and a pair of dry stream apertures, and to incorporate the WVT assembly into a fuel cell module such as a lower end unit (LEU) of the fuel cell system. The WVT assembly and the end plates are disposed within the housing. The wet stream apertures are in communication with the wet plates of the WVT assembly and the dry stream apertures are in communication with the dry plates of the WVT assembly. The housing further includes a plurality of channels formed adjacent the dry stream apertures and in fluid communication with the wet stream apertures. The outwardly extending ribs of the end plates cooperate with the channels to define a tortuous bypass flow path between the wet stream apertures of the housing.

The dry stream and wet stream are kept separate using the membranes of the WVT assembly, which allow water vapor to pass from the wet stream to the dry stream without allowing gases such as oxygen through (i.e. the dry air flow is humidified but the oxygen content is not depleted). It is known that a water transfer rate of the WVT assembly degrades over the lifetime of the WVT assembly. It is desirable that a difference between a beginning of life (BOL) water transfer rate and an end of life (EOL) water transfer rate at high flows does not exceed a specific deviation, for example, about −20%, from a target water transfer rate. Due to performance variation between different WVT assemblies, certain ones of the different WVT assemblies may undesirably be closer to the EOL water transfer rate than other ones of the different WVT assemblies at BOL. It is known to mask portions of the plates in the WVT assembly during pre-assembly testing to tune the WVT assembly to a desired BOL water transfer rate. However, the masking is undesirably wasteful since an entirety of the WVT assembly is not being utilized.

It has also been known to use a non-integrated actively controlled bypass valve to control water transfer rate in operation. However, actively controlled bypass valves add significant complexity to the fuel cell system, in addition to requiring significant packaging volume for the associated valve and manifolding.

There is a continuing need for a WVT assembly that provides an ability to tune a BOL water transfer rate at high flows, and minimize BOL performance variation to permit for additional allowable water transfer rate degradation over the lifetime of the WVT assembly. Desirably, the WVT assembly minimizes flow bypass at low flows that would otherwise create poor idle performance, and can be packaged within an existing WVT housing.

SUMMARY OF THE INVENTION

In concordance with the instant disclosure, a WVT assembly that provides an ability to tune a BOL water transfer rate at high flows, and minimize BOL performance variation to permit for additional allowable water transfer rate degradation over the lifetime of the WVT assembly, minimizes flow bypass at low flows that would otherwise create poor idle performance, and can be packaged within an existing WVT housing, is surprisingly discovered.

In one embodiment, a bypass unit for a water vapor transfer assembly includes a main body, a check valve, and an adjustable flow regulator. The main body has a conduit formed therethrough. The check valve is in communication with the conduit. The check valve normally militates against a flow of a bypass stream through the conduit and permits the flow of the bypass stream through the conduit above a threshold flow rate. The adjustable flow regulator is in communication with the conduit. The adjustable flow regulator permits an adjustment of the flow of the bypass stream to modify the water transfer rate of the water transfer assembly.

In another embodiment, a water transfer assembly includes one of a pair of end units between which the stack of wet plates, dry plates, and water transfer membranes is disposed, and a spacer disposed in the stack of wet plates, dry plates, and water transfer membranes. One of end units and the spacer includes the bypass unit.

In a further embodiment, a method for modifying a water transfer rate of a water transfer assembly with the bypass unit includes supplying one of the wet stream and the dry stream to the water transfer assembly. A relative humidity of the dry stream is measured following the transfer of water from the wet stream to the dry stream to determine a water transfer rate for the water transfer assembly. The flow regulator of the bypass unit is then adjusted to modify the water transfer rate of the water transfer assembly.

DRAWINGS

The above, as well as other advantages of the present disclosure, will become readily apparent to those skilled in the art from the following detailed description, particularly when considered in the light of the drawings described herein.

FIG. 3A is a cross-sectional side elevational view of the bypass unit taken at section line A-A in FIG. 2, further showing an unopened integrated check valve and a closed adjustable flow regulator;

FIG. 3B is a cross-sectional elevational view of the bypass unit take at section line A-A in FIG. 2, further showing an opened integrated check valve and an opened adjustable flow regulator.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

As shown in FIGS. 1-4, a water vapor transfer assembly 2 includes a plurality of wet plates configured to receive a wet stream 3, and a plurality of dry plates configured to receive a dry stream 5. The wet plates and the dry plates alternate in a stack and are separated from one another by water transfer membranes. The water vapor transfer assembly 2 permits a transfer of water from the wet stream 3 to the dry stream 5 during an operation of the water vapor transfer assembly 2. An exemplary water vapor transfer assembly is described in U.S. Pat. Appl. Pub. No. 2009/0092863 to Skala, the entire disclosure of which is hereby incorporated herein by reference. One of ordinary skill in the art should appreciate that other configurations and types of water vapor transfer assemblies 2 may also be used within the scope of the present disclosure.

Figure 1:
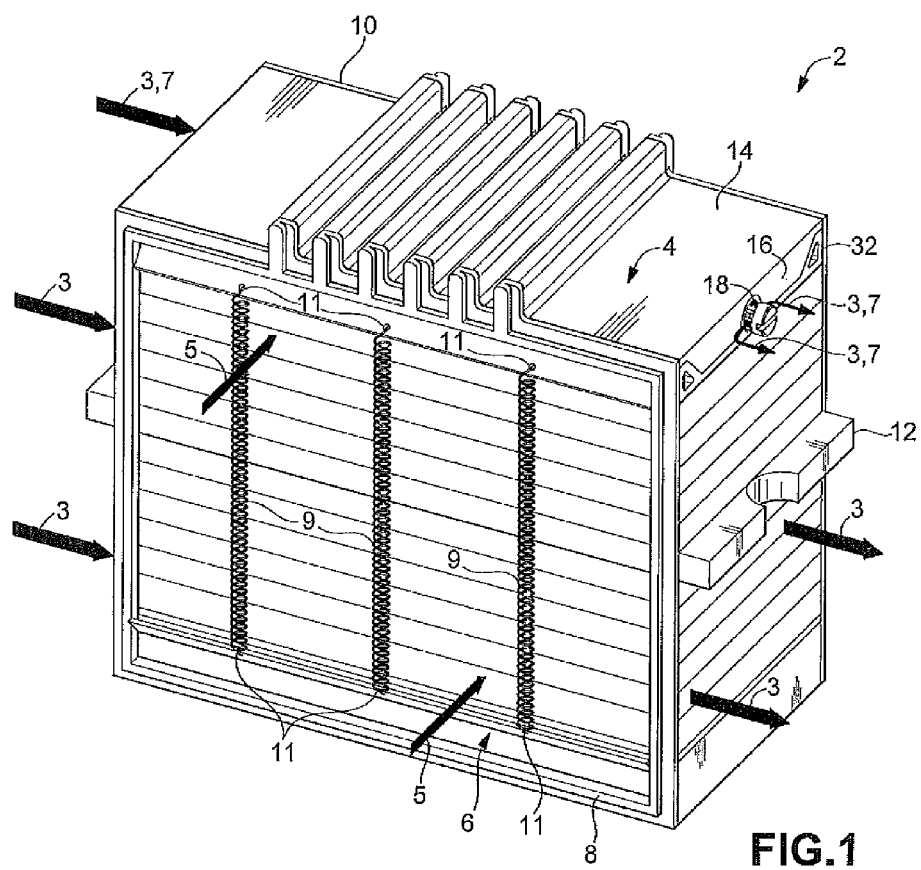
FIG. 1 is a perspective view of a water vapor transfer assembly according to one embodiment of the present disclosure, shown without a housing, and further showing an exemplary flow direction of a wet stream and a dry stream through the water vapor transfer assembly.

The water vapor transfer assembly 2 includes at least one of an upper end unit 4 and a lower end unit 6. The water vapor transfer assembly 2 is disposed between the upper and lower end units 4, 6. The upper and lower end units 4, 6 are configured to compliantly compress the wet and dry plates and the water transfer membranes of the water vapor transfer assembly 2 therebetween. The compliant compression of the wet and dry plates and the water transfer membranes permits a "breathing" of the water vapor transfer assembly 2 in operation. For example, the upper and lower end units 4, 6 may have spring retention features 11 that are connected by a plurality of coil springs 9, as shown in FIG. 1. Other means for compliantly compressing the wet and dry plates and water transfer membranes between the upper and lower end units 4, 6 may also be employed, as desired.

The water vapor transfer assembly 2 and the upper and lower end units 4, 6 are disposed within a housing (not shown). The housing can be a discrete device or a cavity highly integrated into the upper and lower end units 4, 6, as desired. The housing has wet stream apertures and dry stream apertures for delivery and exhaust of the wet stream 3 and dry stream 5 to and from, respectively, the water vapor transfer assembly 2. The wet stream aperture may be an inlet for the wet stream 3 having a water vapor content. The wet stream aperture may be an outlet for the wet stream 3 having the water vapor content. The wet stream apertures are in communication with the wet plates of the water vapor transfer assembly 2. The dry stream apertures are in communication with the dry plates of the water vapor transfer assembly 2. The dry stream apertures and the wet stream apertures permit a flow of the dry stream 5 through the water vapor transfer assembly 2 that is substantially transverse with respect to a flow and the wet stream 3 through the water vapor transfer assembly 2. Other directions for the flows of the wet stream 3 and the dry stream 5 may also be employed within the scope of the present disclosure. The housing may also be either a single, one-piece housing, or a multi-piece housing, as desired.

The water vapor transfer assembly 2 may further include a pair of elastomeric seals 8, 10. The elastomeric seals 8, 10 abut the end units 4, 6 and the plates of the water vapor transfer assembly 2. The elastomeric seals 8, 10 also abut an adjacent mating component (not shown) of a fuel cell module that delivers the dry stream 5 to the water vapor transfer assembly 2. A substantially fluid-tight seal is formed by the elastomeric seals 8, 10, which militates against a leakage of the dry stream 5 into the wet stream 3 during operation of the water vapor transfer assembly 2. As a nonlimiting example, a cooperation of the elastomeric seals 8, 10 with an exemplary housing is disclosed in Assignee's copending U.S. patent application Ser. No. 12/796,320 to Martinchek et al., the entire disclosure of which is hereby incorporated herein by reference.

The water vapor transfer assembly 2 may further include a spacer 12. The spacer 12 functions to center the water vapor transfer assembly 2 within the housing. The spacer 12 may also minimize seal movement during expansion and contraction of the water vapor transfer assembly 2, in operation. Although shown substantially centered within the stack in FIG. 1, it should be understood that other locations for the spacer 12 may also be employed, as desired.

In accordance with the present disclosure, the water vapor transfer assembly 2 includes a bypass unit 14. Although the bypass unit 14 is shown in FIGS. 1-4 as part of the upper end unit 4, it should be understood that the bypass unit 14 may likewise be part of the lower end unit 6, the spacer 12, or in another location suitable location with the water vapor transfer assembly 2, as desired.

Figure 2:
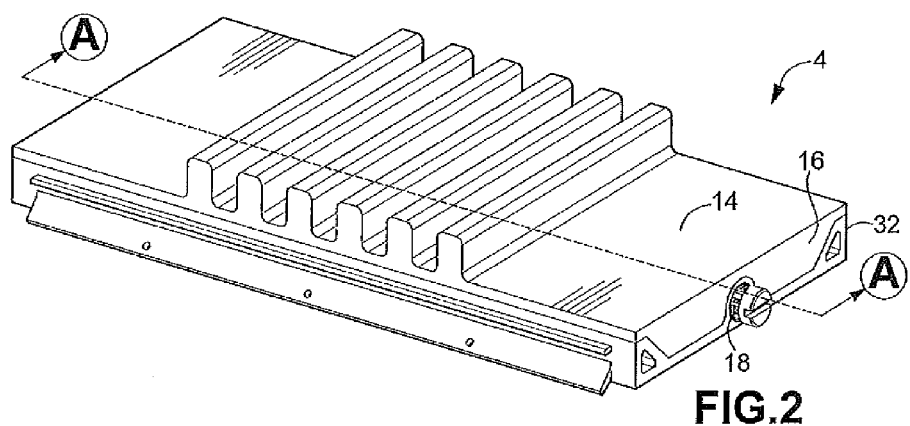
FIG. 2 is a perspective view of a bypass unit of the water vapor transfer assembly illustrated in FIG. 1.

Referring to FIGS. 2 and 3A-3B, the bypass unit 14 has a main body 16 with a conduit 18 formed therethrough. A check valve 20 is in communication with the conduit 18. As shown in FIG. 3A, the check valve 20 normally militates against a flow of a bypass stream 7 through the conduit 18. As shown in FIG. 3B, the check valve 20 permits the flow of the bypass stream 7 through the conduit 18 above a threshold flow rate. The threshold flow rate may be selected, as desired, by a skilled artisan. Although the bypass stream 7 is shown in FIGS. 1-4 as being the wet stream 3, one of ordinary skill in the art should understand that the bypass stream 7 may alternatively, or additionally, include the dry stream 5 within the scope of the present disclosure.

With continued reference to FIGS. 3A-3B, the conduit 18 may include a first portion 22 and a second portion 24. The first portion 22 is disposed adjacent an inlet for the bypass stream 7, and the second portion 24 is disposed adjacent an outlet for the bypass stream 7. The first portion 22 and the second portion 24 may have different inner diameters. For example, the first portion 22 may have a lower inner diameter than the second portion 24. Other relative inner diameters of the first portion 22 and the second portion 24 may also be employed, as desired.

In particular embodiments, the check valve 20 is disposed within the second portion 24 of the conduit 18. As a nonlimiting example, the check valve 20 may include a flap type valve disposed within the second portion 24 of the conduit. Any check valve 20 configured to open and permit the flow of the bypass stream 7 through the conduit 18 when a flow rate exceeds a predetermined threshold may be used within the scope of the present disclosure.

In certain embodiments, the check valve 20 includes a biasing spring 26 and a plug 28 disposed within the conduit 18. The biasing spring 26 is disposed between the plug 28 and the outlet for the bypass stream 7. The biasing spring 26 may be a coil spring, as a nonlimiting example, although other types of springs may also be used. The biasing spring 26 normally biases the plug 28 toward a seat surface 30 of the conduit 18. The seat surface 30 may be disposed at an interface of the first portion 22 and the second portion 24 of the conduit 18, for example. Other locations for the seat surface 30 within the conduit 18 may also be employed, as desired.

The plug 28 and the seat surface 30 may have corresponding shapes in order to facilitate a substantially fluid tight seal when the plug 28 is seated against the seat surface 30. In the embodiment shown in FIGS. 3A-3B, the plug 28 is substantially spherical and the seat surface 30 substantially conical in order to receive the substantially spherical plug 28. A skilled artisan should understand that other shapes may also be used.

The plug 28 may be formed from a material such as a rubber or compliant thermoplastic material that facilitates the formation of the substantially fluid tight seal when the plug 28 is seated. In operation, the plug 28 is seated against the seat surface 30 to militate against the flow of the bypass stream 7 when the flow is below the threshold flow rate. The plug 28 is unseated from the seat surface 30 when the flow of the bypass stream 7 is above the threshold flow rate, due to a pressure of the bypass stream 7 overcoming a biasing force of the biasing spring 26.

The check valve 20 of the present disclosure may have a valve cracking pressure selected to militate against the flow of the bypass stream 7, when the wet stream 3 and the dry stream 5 have sufficiently low rates of flow. The valve cracking pressure is thereby selected to minimize opportunities for poor idle performance of the water vapor transfer assembly 2.

The bypass unit 14 of the present disclosure further includes a flow regulator 32 in communication with the conduit 18. The flow regulator 32 is adjustable and may be at least partially disposed in the second portion 24 of the conduit 18. As shown in FIGS. 3A-3B, the flow regulator 32 may be adjusted from a closed position (FIG. 3A) to a fully open position (FIG. 3B), and to a multitude of partially open positions therebetween. Although the flow regulator 32 is shown disposed in the outlet of the conduit 18, it should be appreciated that the flow regulator 32 may alternatively be disposed in the inlet of the conduit 18, for example, in the first portion 22 of the conduit 18, as desired.

Figure 4:
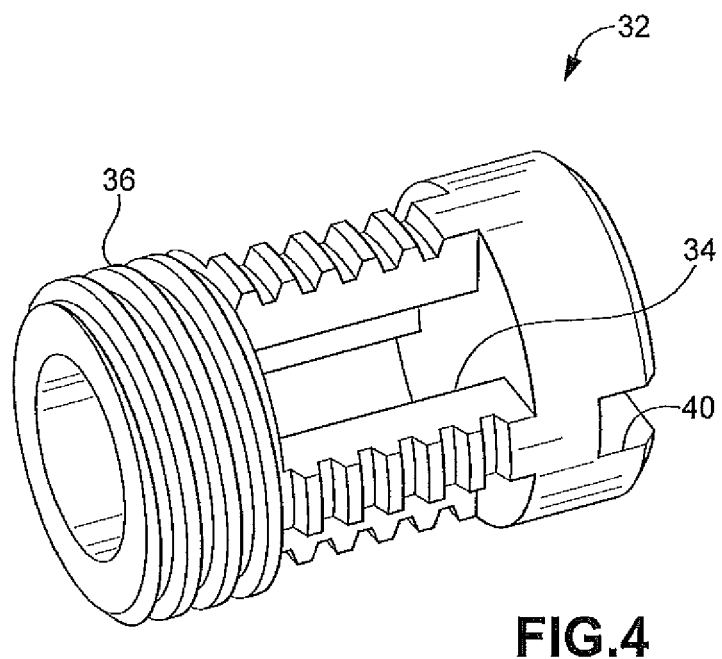
FIG. 4 is an enlarged perspective view of the adjustable flow regulator illustrated in FIGS. 1-3B.

With reference to FIG. 4, the flow regulator 32 is hollow and has at least one slot 34 formed therein. One end of the flow regulator 32 is closed. The slot 34 may be an elongate hole formed through the flow regulator 32. In a particular embodiment, the flow regulator 32 has an outer thread 36 and the second portion 24 of the conduit 18 has an internal thread 38. The outer thread 36 and the internal thread 38 cooperate to secure the flow regulator 32 within the second portion 24 of the conduit 18.

It should be understood that, being adjustable, the flow regulator 32 selectively permits the flow of the bypass stream 7 therethrough. The at least one slot 34 may be exposed to the bypass stream 7 to flow therethrough when the flow regulator 32 is moved within the conduit 18. For example, where the flow regulator 32 is adjusted inwardly, the slot 34 is not exposed and the bypass stream 7 is not permitted to flow therethrough. Where the regulator 32 is adjusted partially outwardly, a portion of slot 34 is exposed and a partial flow of the bypass stream is permitted therethrough. Where the regulator 32 is adjusted fully outwardly, an entirety of the slot 34 is exposed and a maximum flow of the bypass stream 7 is permitted therethrough.

As the outer thread 36 and the internal thread 38 cooperate to secure the flow regulator 32 within the second portion 24 of the conduit 18, a rotation of the flow regulator 32 may be employed to move the regulator 32 inwardly or outwardly to selectively expose the at least one slot 34. A skilled artisan should understand that an extent to which the slot 34 is exposed depends on an extent to which the flow regulator 32 is rotated within the second portion 24 of the conduit 18.

In certain embodiments, the flow regulator 32 may have a groove 40 formed on the closed end thereof to facilitate a rotatable adjustment of the flow regulator 32, for example, with a screwdriver or the like. In other embodiments, the closed end of the flow regulator 32 may have a gripping surface, for example, to facilitate a manual or hand-adjustment of the flow regulator 32. Other means for facilitating an adjustment of the flow regulator 32 within the conduit 18 may also be employed within the scope of the disclosure.

The present disclosure further includes a method for modifying the water transfer rate of the water transfer assembly 2 having the bypass unit 14. The method includes a step of supplying one of the wet stream 3 and the dry stream 5 to the water transfer assembly 2. A relative humidity of the dry stream 5 following the transfer of water from the wet stream 3 to the dry stream 5 is measured. The relative humidity of the dry stream 5 may be known beforehand, or may be measured before the transfer of water from the wet stream 3 to the dry stream 5. The water transfer rate for the water transfer assembly 2 is determined from the difference in measured relative humidity of the dry stream 5 following the transfer of water. The flow regulator 32 of the bypass unit 14 is subsequently adjusted to modify a rate of the bypass flow 7, and thus, the water transfer rate of the water transfer assembly 2. Were a target water transfer rate is desired, the water transfer assembly 2 may thereby be tuned to account for any manufacturing or performance variation present in the water transfer assembly 2.

In a particular embodiment, the flow regulator 32 is adjusted to maximize the water transfer rate of the water transfer assembly 2 relative to a desired EOL water transfer rate.

The water vapor transfer assembly 2 of the present disclosure, and particularly the flow regulator 32, advantageously provides an ability to tune a BOL water transfer rate at high flows, and minimize BOL performance variation to permit for additional allowable water transfer rate degradation over the lifetime of the water vapor transfer assembly 2. The check valve 20, in particular, minimizes flow bypass at low flows that would otherwise create poor idle performance. Advantageously, the water vapor transfer assembly 2 can also be packaged within known housing.

It is further estimated that the water vapor transfer assembly 2 minimizes water transfer rate variation to allow for additional average water transfer rate degradation over a useable lifetime of the water vapor transfer assembly 2.

While certain representative embodiments and details have been shown for purposes of illustrating the invention, it will be apparent to those skilled in the art that various changes may be made without departing from the scope of the disclosure, which is further described in the following appended claims.

What is claimed is:

1. A bypass unit for a water vapor transfer assembly, comprising:
   a main body having a conduit formed therethrough, the conduit including a first portion and a second portion;
   a check valve in communication with the conduit and disposed within the second portion of the conduit, the check valve including a biasing spring and a plug disposed within the conduit, the biasing spring biasing the plug toward a seat surface of the conduit, wherein the check valve militates against a flow of a bypass stream through the conduit and permitting the flow of the bypass stream through the conduit above a threshold flow rate; and
   a flow regulator in communication with the conduit.

2. The bypass unit of claim 1, wherein the seat surface is disposed at an interface of the first portion and the second portion of the conduit.

3. The bypass unit of claim 1, wherein the plug is seated to militate against the flow of the bypass stream when the flow is below the threshold flow rate.

4. The bypass unit of claim 1, wherein the plug is unseated when the flow of the bypass stream is above the threshold flow rate.

5. The bypass unit of claim 1, wherein the flow regulator is at least partially disposed in the second portion of the conduit.

6. The bypass unit of claim 5, wherein the flow regulator is hollow and has at least one slot formed therein.

7. The bypass unit of claim 6, wherein the flow regulator has a groove formed on an outer surface thereof to facilitate a rotatable adjustment of the flow regulator.

8. The bypass unit of claim 6, wherein the flow regulator has an outer thread and the second portion of the conduit has an internal thread.

9. The bypass unit of claim 8, wherein the outer thread and the internal thread cooperate to secure the flow regulator within the second portion of the conduit.

10. The bypass unit of claim 9, wherein the at least one slot is exposed for the bypass stream to flow therethrough when the flow regulator is rotated within the second portion of the conduit.

11. The bypass unit of claim 10, wherein an extent to which the slot is exposed depends on an extent to which the flow regulator is rotated within the second portion of the conduit.

12. A water vapor transfer assembly, comprising:
    a plurality of wet plates configured to receive a wet stream and a plurality of dry plates configured to receive a dry stream, the wet plates and the dry plates alternating in a stack and separated from one another by water transfer membranes, the at least one water vapor transfer assembly permitting a transfer of water from the wet stream to the dry stream; and
    a bypass unit having a conduit formed therethrough, a check valve in communication with the conduit, the check valve normally militating against a flow of a bypass stream through the conduit and permitting the flow of the bypass stream through the conduit above a threshold flow rate; and a flow regulator in communication with the conduit, the bypass unit configured to receive one of the wet stream and the dry stream.

13. The water vapor transfer assembly of claim 12, further comprising a pair of end units between which the stack of wet plates, dry plates, and water transfer membranes are disposed, at least one of the end units including the bypass unit.

14. The water vapor transfer assembly of claim 12, further comprising a spacer disposed in the stack of wet plates, dry plates, and water transfer membranes, the spacer including the bypass unit.

15. A method for modifying a water transfer rate of a water transfer assembly, the method comprising the steps of:
    providing the water transfer assembly including a plurality of wet plates configured to receive a wet stream and a plurality of dry plates configured to receive a dry stream, the wet plates and the dry plates alternating in a stack and separated from one another by water transfer membranes, the at least one water vapor transfer assembly permitting a transfer of water from the wet stream to the dry stream, and a bypass unit having a conduit formed therethrough, a check valve in communication with the conduit, the check valve normally militating against a flow of a bypass stream through the conduit and permitting the flow of the bypass stream through the conduit above a threshold flow rate, and a flow regulator in communication with the conduit, the bypass unit configured to receive one of the wet stream and the dry stream;
    supplying the one of the wet stream and the dry stream to the water transfer assembly;
    measuring a relative humidity of the dry stream following the transfer of water from the wet stream to the dry stream to determine a water transfer rate for the water transfer assembly; and
    adjusting the flow regulator of the bypass unit to modify the water transfer rate of the water transfer assembly.

16. The method of claim 15, wherein the water vapor transfer assembly includes one of a pair of end units between which the stack of wet plates, dry plates, and water transfer membranes are disposed, and a spacer disposed in the stack of wet plates, dry plates, and water transfer membranes, and wherein one of end units and the spacer includes the bypass unit.

17. The method of claim 15, wherein the flow regulator is adjusted to maximize the water transfer rate of the water transfer assembly relative to a desired end of life water transfer rate and minimize an opportunity for flooding of the water transfer assembly at high flow rates of the wet stream.

* * * * *